(12) United States Patent
Mirza

(10) Patent No.: US 12,360,909 B2
(45) Date of Patent: Jul. 15, 2025

(54) LAST USE CACHE POLICY

(71) Applicant: ATI TECHNOLOGIES ULC, Markham (CA)

(72) Inventor: Jimshed Mirza, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/955,888

(22) Filed: Sep. 29, 2022

(65) Prior Publication Data

US 2024/0111681 A1   Apr. 4, 2024

(51) Int. Cl.
*G06F 12/0877* (2016.01)

(52) U.S. Cl.
CPC ...... *G06F 12/0877* (2013.01); *G06F 2212/60* (2013.01)

(58) Field of Classification Search
CPC .......... G06F 12/0877; G06F 2212/60
See application file for complete search history.

(56) References Cited

U.S. PATENT DOCUMENTS

| | | | | |
|---|---|---|---|---|
| 9,971,699 | B2* | 5/2018 | Krashinsky | G06F 12/0891 |
| 2009/0172291 | A1* | 7/2009 | Sprangle | G06F 12/127 |
| | | | | 711/134 |
| 2015/0058571 | A1* | 2/2015 | Potter | G06F 9/383 |
| | | | | 711/125 |
| 2021/0182216 | A1* | 6/2021 | Yin | G06F 12/126 |
| 2022/0066940 | A1* | 3/2022 | Alsop | G06F 12/0882 |

* cited by examiner

*Primary Examiner* — Baboucarr Faal

(57) ABSTRACT

A processor for implementing a last use cache policy is configured to access data in a portion of a cache, determine that the data in the portion of the cache is no longer needed, and mark the data in the portion of the cache as non-dirty responsive to the determining that the data in the portion of the cache is no longer needed. The marking of the data as non-dirty is indicative that the data in the portion of the cache is not to be evicted from the cache to a memory.

20 Claims, 4 Drawing Sheets

LAST USE CACHE POLICY

BACKGROUND

A cache is a block of memory local to a processor used to temporarily store data that is likely to be used again by the processor to enable faster access to the data. A cache line is a block of memory of a fixed size within the cache. Typically, a cache line eviction policy is used to periodically evict the data stored in a cache line to a memory device, such as random access memory (RAM). During cache line eviction, the data stored in a cache line is written to the memory device. As such, the cache line eviction procedure consumes memory bandwidth, consumes energy, and increases memory wear on the memory device.

DETAILED DESCRIPTION

Figure 1:
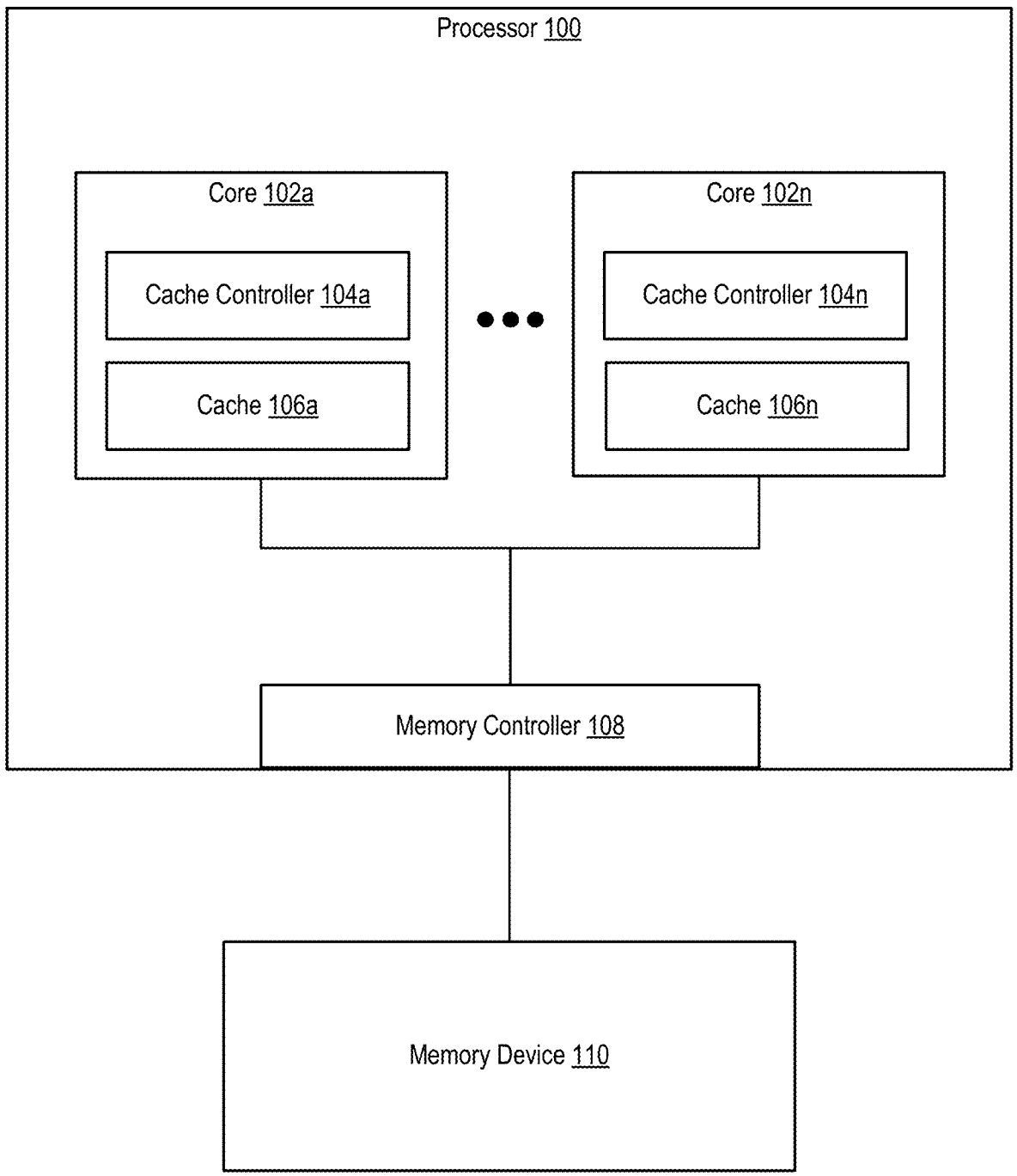
FIG. 1 is a block diagram of an example processor for implementing last use cache policy operations according to some implementations.

Various controllers, such as processor cores and the like, temporarily store data in local caches during execution of various processes or software applications in order to allow faster access to the data than could be achieved if the data is stored in main memory devices, such as RAM, coupled to the controller. This data is stored in one or more cache lines within the cache. Typically, a cache line is marked as "dirty" if the data contained in the cache line has changed since it was read from main memory and the changed value has not yet been written back to main memory. With existing traditional cache line management policies (also referred to as cache eviction policies), cached data marked as dirty is "evicted" or written back from the cache line to the main memory. The cache line eviction procedure consumes memory bandwidth, consumes energy, and increases memory wear on the memory device.

To that end, the present specification sets forth various implementations for last use cache policy operations. Various implementations provide for a new cache management policy in which a cache line that is marked as dirty is instead marked as non-dirty when the data in the cache line is known to no longer be needed. Situations in which the data in the cache line is known to no longer be needed include situations in which data is to be consumed (read) only once by a user (e.g., a process or application) or in which an executed instruction is the last consumer of the data. In such cases, rather than letting the data sit in the dirty cache line, eventually be evicted to memory, and never read again from memory, implementations described herein mark the cache line storing the data as non-dirty. By marking the cache-line as non-dirty, the data in the cache line is prohibited from being evicted from the cache to memory. Instead, the cache line is available to be overwritten. As a result, utilization memory bandwidth and energy consumption required to write the data from the cache line to memory, which would otherwise have occurred during eviction, is eliminated.

In an example scenario, a process writes out data into a cache line of a cache and subsequently modifies the data in the cache line (without the data being updated in backing memory). When data in the cache line is different than data in backing memory, the cache line is marked as a dirty. Conventional cache eviction policies would cause the dirty cache line to be evicted to memory (data in the cache line is written to backing memory) even if that data is never to be read again. According to the cache management policies described herein, however, the process reads the data from a dirty cache line and indicates, for example, "this is the only read of the data" or "this data is finished being consumed." Such an indication can take various forms. In some implementations, an instruction is executed that specifies the last use of data and a read command that specifically includes an indication of last use is issued to the cache, causing the cache line to be set as non-dirty. In other examples, the process can specify various memory attributes in memory associated with a memory address or memory address range. One such memory attribute can be set to indicate that data stored at the memory address will be read only once. When data at the memory address is stored in a cache line (as a result of a write command, for example), the memory attributes associated with the memory address are likewise stored in the cache. When a cache controller receives a read command that includes the memory address, the cache controller determines, from the memory attributes associated with the memory address, that data at the memory address is only to be read once. As such, if the cache line storing the data is marked as dirty, the cache controller changes the state of the cache line from dirty to non-dirty. As a result, the cache line is not written out to memory, but may be overwritten without adverse effects on the executing process or application.

Various apparatus, systems, and methods for implementing a last use cache policy are described herein. Such an apparatus includes a cache that includes a plurality of cache lines. The apparatus also includes a cache controller including logic to receive a read command that includes a memory address of data stored in a cache line of the cache. The cache controller also includes logic to change a state of the cache line from dirty to non-dirty responsive to the read command comprising a last use of the data at the memory address. The cache controller also includes logic to skip eviction of the cache line based on the non-dirty state of the cache line. In some implementations, the cache controller also includes logic to overwrite the data of the cache line based on the non-dirty state of the cache line. A last use of the data is, in some implementations, a single read of the data. In other implementations, a last use of the data is a final read of the data.

In some implementations, the read command includes an indication of last use of the data at the memory address. In other examples, the cache controller includes logic to locate, in memory attributes associated with the memory address, an indication of last use of the data at the memory address. The memory attributes associated with the memory address are stored in the cache line.

In some implementations, the cache controller includes logic to receive a write command that includes the data and the memory address (prior to the read command). The cache controller also includes logic to store the data in the cache line without storing the data in backing memory and mark the cache line as dirty.

A system described in this specification for implementing a last use cache policy, includes a processor core and one or more caches coupled to the processor core. Each cache includes a plurality of cache lines. The cache controller also includes logic to receive a read command from the processor core that includes a memory address of data stored in a cache line and change a state of the cache line from dirty to non-dirty.

In some examples of the system, the cache controller includes logic to skip eviction of the cache line based on the non-dirty state of the cache line and logic to overwrite the data of the cache line based on the non-dirty state of the cache line.

In some aspects of the system, the read command includes an indication of last use of the data at the memory address. In some examples of the system the read command is issued as a result of the processor core executing an instruction that specifies the last use of the data at the memory address. In other examples, the cache controller of the system locates an indication of last use of the data at the memory address in memory attributes associated with the memory address.

In some aspects, the cache controller of the system also includes logic to receive, prior to the read command, a write command including the data and the memory address. The cache controller stores the data in the cache line without storing the data in backing memory and marks the cache line as dirty.

A method of implementing a last use cache policy as described herein includes receiving a read command that includes a memory address of data stored in a cache line of a cache. The method also includes changing a state of the cache line from dirty to non-dirty responsive to the read command comprising a last use of the data at the memory address. In some aspects, the method also includes skipping eviction of the cache line based on the non-dirty state of the cache line and overwriting the data of the cache line based on the non-dirty state of the cache line.

In some variations, the read command includes an indication of last use of the data at the memory address. In other examples, the method includes locating an indication of last use of the data at the memory address in memory attributes associated with the memory address.

FIG. 1 is a block diagram of a non-limiting example processor 100. The example processor 100 can be implemented in a variety of computing devices, including mobile devices, personal computers, peripheral hardware components, gaming devices, set-top boxes. The example processor 100 is implemented, in various aspects, as a Central Processing Unit (CPU), a graphics processing unit (GPU), a machine learning accelerator, a cryptocurrency mining accelerator, or the like.

The processor 100 includes multiple cores 102*a*-102*n*, coupled to a memory controller 108. The memory controller 108, couples the processor 100 to a memory device 110. The memory device, in some aspects, is RAM that operates as a backing memory for the caches 106*a*-106*n*. The memory controller 108 processes commands to read data from and write data to the memory device 110. The memory controller 108, for example, retrieves data from a memory address responsive to a read command and stores the data in a cache line when the data was not previously stored in the cache line. The memory controller 108 also writes data that was previously stored in a cache line, then modified, back to the memory device at the memory address from which the data originated so that a copy of the data in the cache line matches the copy of the data at the memory address in the memory device.

Each core 102*a*-*n* of the example processor 100 is a separately operating processing device that reads and executes program instructions. Each core 102*a*-*n* includes a cache 106*a*-*n* and a cache controller 104*a*-104*n*. Each cache 106*a*-*n* includes a number of cache lines that are configured to temporarily store data associated with processes and instructions executed by the respective core 102*a*-*n*.

Each cache controller 104*a*-104*n* implements a cache management policy that determines when cached data is to be written to the memory device 110. In various implementations, the cache management policy, includes the last use cache policy described herein. The example cache controller 104*a*-104*n* in the example of FIG. 1 implements the cache management policy provided herein by receiving a read command that includes a memory address of data stored in a cache line of the cache and, responsive to determining that the read is a last use of the data at the memory address, change a state of the cache line from dirty to non-dirty. The cache management policy also specifies various rules for carrying out eviction of cache lines. In some examples, the cache controller 104*a*-104*n* is configured to evict a number of cache lines that are least recently used and marked dirty. Because the cache controller marked the cache line mentioned above as non-dirty, eviction of the cache line will be skipped by the cache controller. That is, even in situations where the cache line would have been evicted if marked dirty, the cache line will not be selected for eviction when the cache controller carries out the eviction process. By eliminating an eviction of the cache line, the power consumption that would have been incurred by the eviction is eliminated and memory bandwidth that would have been utilized by the eviction is eliminated.

Although the approaches disclosed herein are described with respect to caches 106*a*-*n* are associated with respective cores 102*a*-*n*, one skilled in the art will appreciate that these approaches are also applicable to caches stored on separate dies and with caches at different levels in a memory hierarchy.

Figure 2:
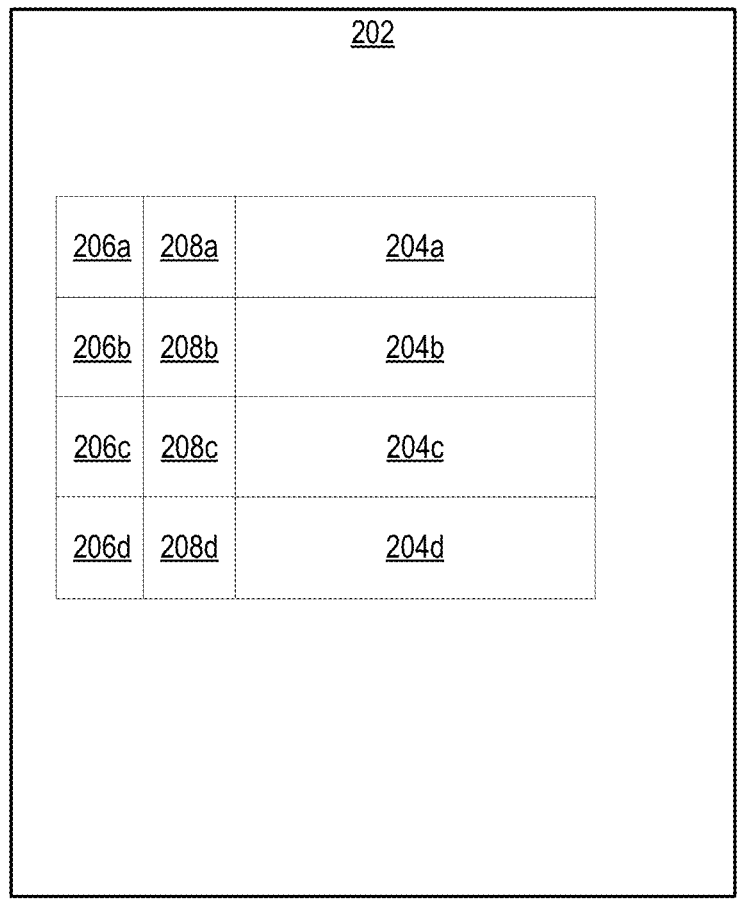
FIG. 2 is a diagram of an example cache structure for implementing last use cache policy operations according to some implementations.

FIG. 2 is a diagram of an example cache structure 202 for implementing last use cache policy operations according to some implementations of the present disclosure. The example cache structure 202 includes four cache lines 204*a*, 204*b*, 204*c*, and 204*d*. Each of the cache lines 204*a*-204*d* is configured to temporarily store data associated with execution of a process or instruction by a processor such as processor 100 of FIG. 1. Each of the cache lines 204*a*-204*d* includes an associated status flag 206*a*, 206*b*, 206*c*, 206*d* indicating whether the particular cache line 204*a*-204*d* is dirty or non-dirty.

In some implementations, a cache controller that includes logic to implement the last use cache policy described herein, determines that the data in a particular cache line 204*a*-204*d* is no longer needed. The cache controller can make such a determination in a variety of ways. In some examples, the cache controller receives a read command that includes the memory address of the data in the cache line and also includes, as a parameter of the read command, an indication of last use of the data. Such an indication, in some examples, is implemented as flag comprising a bit or bytes, where one value of the bit or bytes (such as a 1 or byte of 1s) indicates a last use and any other value (such as a 0 or a byte of 0s) does not indicate a last use.

In other implementations, the cache controller determines that data in a particular cache line, such as 204*a* for example, is no longer needed by inspecting a set of memory attributes in a memory attributes field 208*a* associated with the memory address of the data in the cache line. Each cache line of FIG. 2 is associated with a memory attributes field 208*a*, 208*b*, 208*c*, 208*d*. Various memory attributes can be specified by an executing process in memory through write commands. For example, a process can allocate a memory address and indicate in a memory attribute associated with the memory address that data stored in the memory address will only be read once. When a first write to the memory address occurs, the cache controller will store the data of the write in the cache line 204a, retrieve the memory attributes associated with the memory address, and store the attributes in the memory attribute field 208a. The cache controller will also mark the cache line 204a as dirty using the status flag 206a if the cache controller does not write the data from the initial write command back to memory. Once the data is in the cache line, various writes can modify the data in the cache line causing the line to be marked as dirty (if already marked dirty, no change is needed). When the cache controller receives a read command of the memory address, the cache controller will inspect the memory attributes field 208a associated with the cache line 204a and determine that the memory attributes indicate the data is read only once. As such, the cache controller changes the state of the cache line 204a from dirty to non-dirty. The cache controller, when later evicting cache lines, will skip the cache line 204a during the eviction process. Instead, the cache line can be overwritten.

Figure 3:
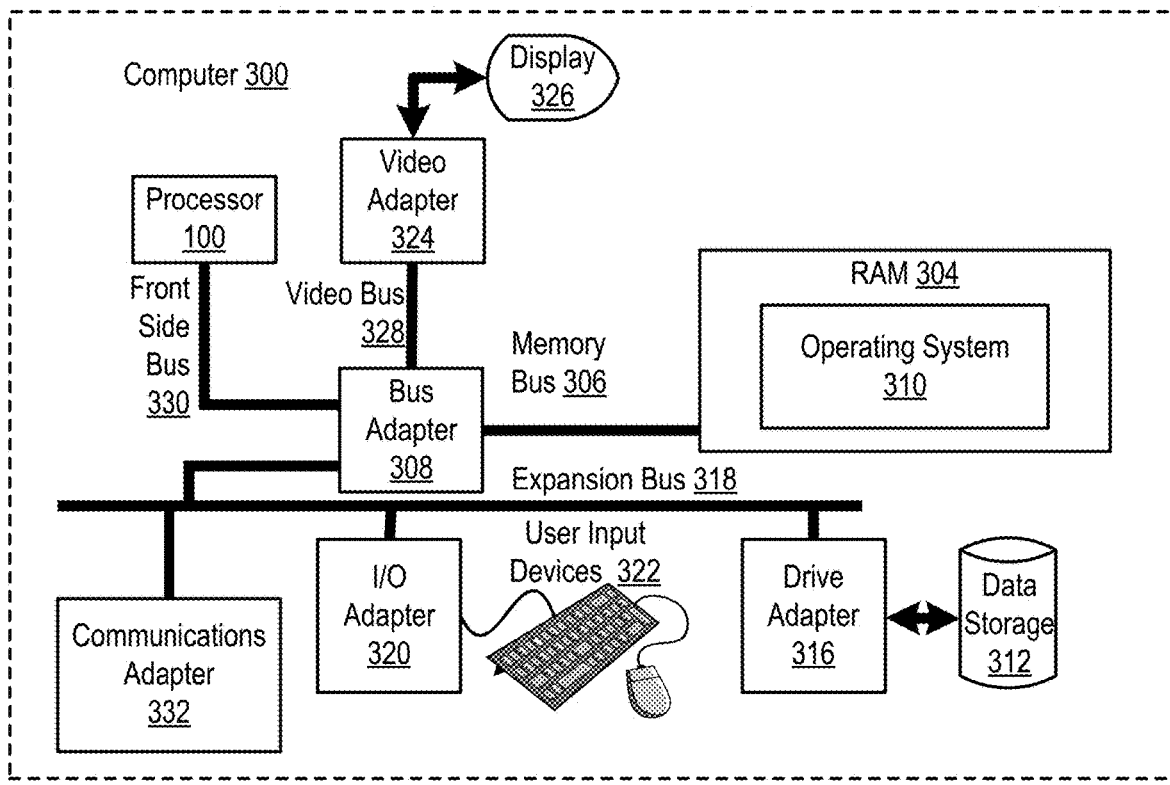
FIG. 3 is a block diagram of an example computer for implementing last use cache policy operations according to some implementations.

In some implementations, the processor of FIG. 1 and cache of FIG. 2 are implemented as components of a computer. FIG. 3 is a block diagram of an example computer for implementing last use cache policy operations according to some implementations. In addition to at the processor 100, the computer 300 of FIG. 3 includes random access memory (RAM) 304 which is connected through a high speed memory bus 306 and bus adapter 308 to processor 302 and to other components of the computer 300. Stored in RAM 304 is an operating system 310. The operating system 310 in the example of FIG. 3 is shown in RAM 304, but many components of such software typically are stored in non-volatile memory, such as for example, data storage 312. Data storage 312 in various implementations includes a disk drive or solid state drive.

The computer 300 of FIG. 3 includes disk drive adapter 316 coupled through expansion bus 318 and bus adapter 308 to processor 100 and other components of the computer 300. Disk drive adapter 316 connects non-volatile data storage to the computer 300 in the form of data storage 312. Such disk drive adapters include Integrated Drive Electronics ('IDE') adapters, Small Computer System Interface ('SCSI') adapters, and others as will occur to those of skill in the art. In some implementations, non-volatile computer memory is implemented as an optical disk drive, electrically erasable programmable read-only memory (so-called 'EEPROM' or 'Flash' memory), RAM drives, and so on, as will occur to those of skill in the art.

The example computer 300 of FIG. 3 also includes one or more input/output ('I/O') adapters 320. I/O adapters implement user-oriented input/output through, for example, software drivers and computer hardware for controlling output to display devices such as computer display screens as well as receiving user input from user input devices 322 (such as keyboards and mice). The example computer 300 of FIG. 3 includes a video adapter 324 (or GPU), which is an example of an I/O adapter specially designed for graphic output to a display device 326 such as a display screen or computer monitor. Video adapter 324 is connected to processor 100 through a high speed video bus 328, bus adapter 308, and the front side bus 330, which is also a high speed bus.

The exemplary computer 300 of FIG. 3 includes a communications adapter 332 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters 332 implement the hardware level of data communications through which one computer sends data communications to another computer, directly or through a data communications network. Such communication adapters 332 include modems for wired dial-up communications, Ethernet (IEEE 802.3) adapters for wired data communications, and 802.11 adapters for wireless data communications.

Figure 4:
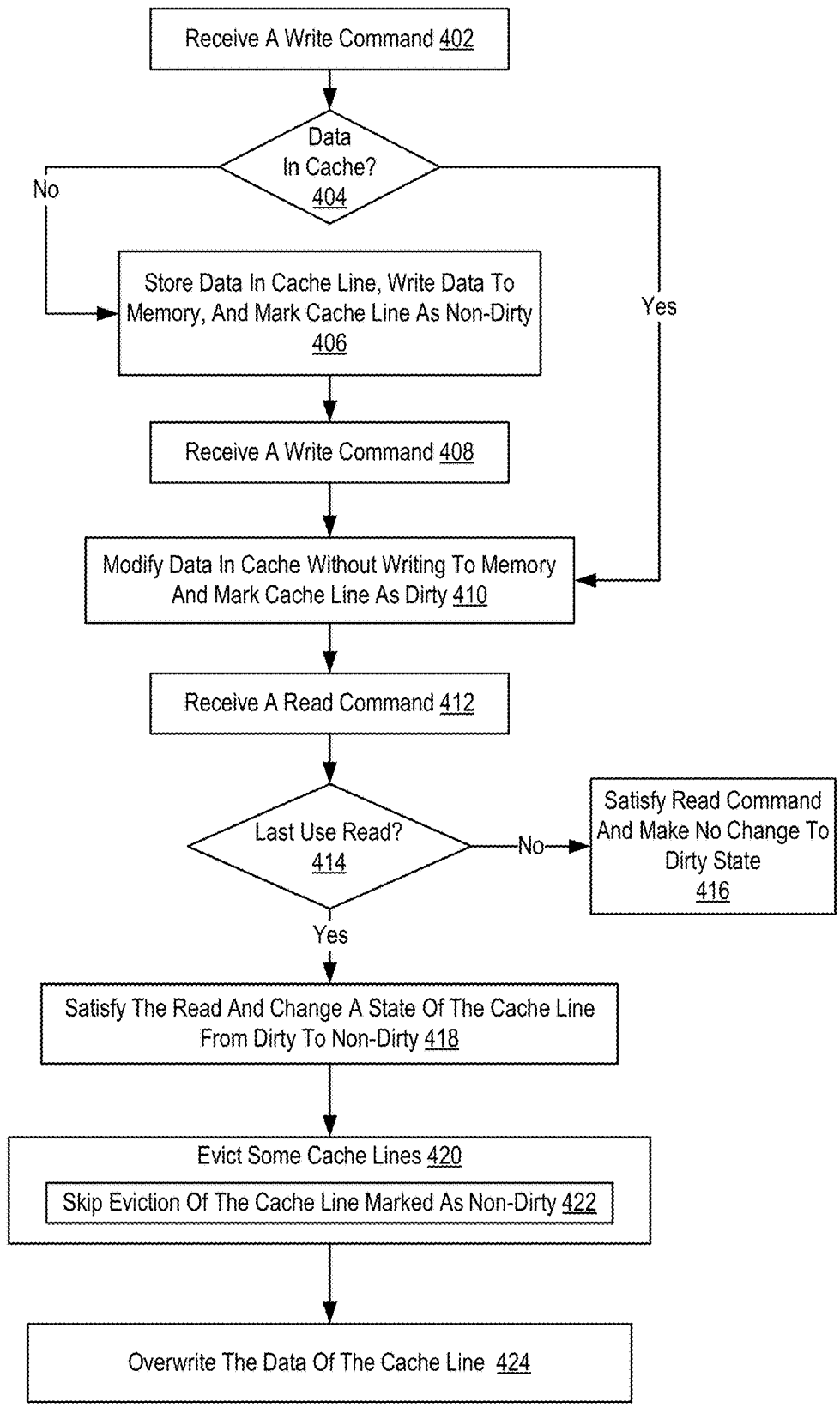
FIG. 4 is a flowchart of an example method implementing last use cache policy operations according to some implementations.

For further explanation, FIG. 4 illustrates an example method for implementing a last use cache policy according to some implementations of the present disclosure. The method of FIG. 4 is performed, for example, by a cache controller such as one of the cache controllers 104a-104n depicted in FIG. 1.

The method of FIG. 4 includes receiving 402 a write command. The write command includes (or specifies a location of) data and a memory address at which to store the data. The cache controller first, determines 404 whether data of the memory address has previously been stored in cache. If not, the cache controller stores 406 the data of the write command in a cache line, writes the data to a memory backing the cache (such as main memory in the form of RAM) and marks the cache line non-dirty. As explained above, a non-dirty state conventionally indicates that a copy of the data in the cache line is the same as the copy of the data in the backing memory. A cache controller 'marks' a cache line as non-dirty in various ways. In one example, a cache directory is maintained that includes, for each cache line, a dirty flag in the form of a bit that, when set to a value of 1 indicates that the state of the associated cache line is dirty and when set to a value of 0 indicates that the state of the associated cache line is non-dirty. In such an implementation, marking the cache line as non-dirty includes changing the bit from a 1 to a 0 if the bit is not already 0.

The method of FIG. 4 also includes receiving 408 a subsequent write command targeting the same memory address. The cache controller determines that the address is within the cache, modifies 410 the data within the cache and marks the cache line as dirty. Marking the cache line as dirty includes, in some aspects, changing a value of a bit representing a dirty flag from 0 to 1 (such as described above in the previous example). Readers will recognize that methods here can include any number of write commands that modify the data in the cache line. Further, while the data is modified in the cache line and not yet backed to memory, the cache line is available as a candidate for eviction. An eviction process can occur periodically or in response to various events. In one example, the cache controller begins an eviction process when the cache is full, and a write command is received that targets a memory address not stored in cache. In the example of FIG. 4, any cache line marked as dirty when an eviction process begins is a candidate for eviction (including the subject cache line in this example).

However, in some aspects, the cache controller receives 412 a read command that includes the memory address of cache line and determines 414 whether the read command is the last use of the data of that memory address. If the read command is not the last use of the data at the memory address, the method continues by satisfying 416 the read command and making no change to the status flag. If, however, the read command is the last use (the last read), the data need not be written back to memory from the cache. To that end, the method of FIG. 4 continues by the cache controller satisfy 418 the read command (providing the data from cache to the requestor) and changing the state of the cache line from dirty to non-dirty. In some examples, the cache controller changes the state by changing the value of a dirty flag bit from 1 to 0.

When the cache line is marked as non-dirty, and the cache controller begins a cache line eviction process, the cache controller will skip 422 eviction of the non-dirty cache line and instead, evict 420 only cache lines marked as dirty. In this way, data from a cache line that would have otherwise written back to memory as part of an eviction of the cache line is not written to memory.

Further, the method of FIG. 4 includes overwriting 424 the data in the cache line marked as non-dirty. The data of the cache line, while not having a copy in memory that matches the copy in the cache line, is overwritten 424 without data corruption concerns because the data is known to be no longer needed. No process will read the data and as such, the data can be overwritten in cache.

The elimination of writing data from what would otherwise be a dirty cache line to memory also eliminates power that would have been consumed in processing the write back of data to memory and eliminates utilization of memory bandwidth that would have been incurred during the write back of data to memory. Implementing last use cache policies results in controllers and processors that consume less power than conventional alternatives and utilize less memory bandwidth than conventional alternatives.

In view of the explanations set forth above, readers will recognize that the benefits of implementing a last use cache management policy include improved performance of a computing system by preserving memory bandwidth and improved energy consumption.

Exemplary implementations of the present disclosure are described largely in the context of a fully functional computer system for implementing a last use cache management policy. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will also recognize that, although some of the exemplary implementations described in this specification are oriented to software installed and executing on computer hardware, nevertheless, alternative implementations implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some implementations, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. An apparatus for implementing a last use cache policy, the apparatus comprising:
   a cache comprising a plurality of cache lines; and
   a cache controller configured to:
   retrieve one or more memory attributes from memory, wherein the one or more memory attributes are associated with a memory address and are stored in the memory as part of allocation of the memory address;
   store the one or more memory attributes retrieved from memory in a cache line of the cache;
   receive a read command that includes the memory address; and
   change a state of the cache line from dirty to a different state responsive to the one or more memory attributes stored in the cache line indicating that the read command comprises a last use of data at the memory address, wherein the one or more memory attributes stored in the cache line indicate that the data at the memory address is no longer needed after the read command.

2. The apparatus of claim 1, wherein the cache controller is further configured to skip eviction of the cache line based on the different state of the cache line.

3. The apparatus of claim 1, wherein the cache controller is further configured to overwrite the data of the cache line based on the different state of the cache line.

4. The apparatus of claim 1, wherein the last use of the data comprises one of: a single read of the data and a final read of the data.

5. The apparatus of claim 1, wherein the read command includes an indication of last use of the data at the memory address.

6. The apparatus of claim 1, wherein the cache controller is further configured to retrieve the one or more memory attributes from memory when a first write to the memory address occurs.

7. The apparatus of claim 6, wherein the one or more memory attributes are stored in a memory attributes field of the cache line.

8. The apparatus of claim 1, wherein the cache controller is further configured to:
   receive, prior to the read command, a write command including the data and the memory address;
   store the data in the cache line without storing the data in backing memory; and
   mark the cache line as dirty.

9. A system implementing a last use cache policy, the system comprising:
   a processor core;
   one or more caches coupled to the processor core, each cache comprising a plurality of cache lines; and
   a cache controller configured to:
   retrieve one or more memory attributes from memory, wherein the one or more memory attributes are associated with a memory address and are stored in the memory as part of allocation of the memory address;
   store the one or more memory attributes retrieved from memory in a cache line of the cache;
   receive a read command from the processor core that includes the memory address; and
   change a state of the cache line from dirty to a different state responsive to the one or more memory attributes stored in the cache line indicating that the read command comprises a last use of data at the memory address, wherein the one or more memory attributes stored in the cache line indicate that the data at the memory address is no longer needed after the read command.

10. The system of claim 9, wherein the cache controller is further configured to skip eviction of the cache line based on the different state of the cache line.

11. The system of claim 9, wherein the cache controller is further configured to overwrite the data of the cache line based on the different state of the cache line.

12. The system of claim 9, wherein the read command includes an indication of last use of the data at the memory address.

13. The system of claim 12, wherein the read command is issued as a result of the processor core executing an instruction that specifies the last use of the data at the memory address.

14. The system of claim 9, wherein the cache controller is further configured to retrieve the one or more memory attributes from memory when a first write to the memory address occurs.

15. The system of claim 13, wherein the cache controller is further configured to:
receive, prior to the read command, a write command including the data and the memory address;
store the data in the cache line without storing the data in backing memory; and
mark the cache line as dirty.

16. A method of implementing a last use cache policy, the method comprising:
retrieving one or more memory attributes from memory, wherein the one or more memory attributes are associated with a memory address and are stored in the memory as part of allocation of the memory address;
storing the one or more memory attributes retrieved from memory in a cache line of the cache;
receiving a read command that includes the memory address; and
changing a state of the cache line from dirty to a different state responsive to the one or more memory attributes stored in the cache line indicating that the read command comprises a last use of data at the memory address, wherein the one or more memory attributes stored in the cache line indicate that the data at the memory address is no longer needed after the read command.

17. The method of claim 16, further comprising skipping eviction of the cache line based on the different state of the cache line.

18. The method of claim 16, further comprising overwriting the data of the cache line based on the different state of the cache line.

19. The method of claim 16, wherein the read command includes an indication of last use of the data at the memory address.

20. The method of claim 16, further comprising retrieving the one or more memory attributes from memory when a first write to the memory address occurs.

* * * * *